United States Patent [19]
Guay

[11] Patent Number: 5,903,275
[45] Date of Patent: May 11, 1999

[54] SUBJECTIVELY PLEASING COLOR GAMUT MAPPING IN A COLOR COMPUTER GRAPHICS SYSTEM

[75] Inventor: Randall G. Guay, Cupertino, Calif.

[73] Assignee: Apple Computer, Inc., Cupertino, Calif.

[21] Appl. No.: 08/813,053

[22] Filed: Mar. 7, 1997

Related U.S. Application Data

[63] Continuation of application No. 08/647,201, May 9, 1996, abandoned, which is a continuation of application No. 08/197,059, Feb. 16, 1994, abandoned.

[51] Int. Cl.[6] ............................................. G06T 5/20
[52] U.S. Cl. ................................... 345/430; 345/431
[58] Field of Search ..................................... 345/430, 431, 345/432

[56] References Cited

U.S. PATENT DOCUMENTS

| | | | |
|---|---|---|---|
| 4,670,780 | 6/1987 | McManus et al. | 358/518 |
| 4,941,038 | 7/1990 | Walowit | 358/518 |
| 5,243,414 | 9/1993 | Dalrymple et al. | 358/500 |
| 5,270,808 | 12/1993 | Tanioka | 358/527 |
| 5,307,182 | 4/1994 | Maltz | 358/518 |
| 5,317,426 | 5/1994 | Hoshino | 358/515 |
| 5,319,473 | 6/1994 | Harrington | 358/501 |
| 5,323,249 | 6/1994 | Liang et al. | 358/518 |
| 5,481,661 | 1/1996 | Kobayashi | 395/131 |

FOREIGN PATENT DOCUMENTS

| | | |
|---|---|---|
| 0 486 311 | 5/1992 | European Pat. Off. . |
| 0 574 905 | 6/1993 | European Pat. Off. . |

OTHER PUBLICATIONS

"Colorimetric calibration in electronic imaging devices using a look–up–table model and interpolations", by Po–Chieh Hung in *Journal of Electronic Imaging*, Jan. 1993, vol. 2(1), pp. 53–61.

*Primary Examiner*—Phu K. Nguyen
*Assistant Examiner*—Cliff N. Vo
*Attorney, Agent, or Firm*—Burns, Doane, Swecker & Mathis, L.L.P.

[57] ABSTRACT

If we assume that images to be printed will consist of a combination of natural images and computer generated images, we would like the natural images to map to the closest printable colors, and the computer generated images to map to the saturated printer colors. Usually, we cannot tell the source of a color specification, so one algorithm must suffice for both conditions. A method to combine the two is presented. First, the printable colors are measured is some device independent color sapce, such as L*a*b*. Next, the range of colors from some reference color CRT, consisting of the colors from black to monitor saturates, and the colors between, then from saturates to white, and the colors between, are calculated. The saturates are assigned colors based on what printable color a user would like to get when the user asks for a saturated CRT color. A good coice would be the color space defined by CCIR 709, but any color space could be used. This gives us the printer's representation of the outer range of the color gamut of the CRT. Next, a table is generated which subsample all colors available to the specified color space. This table fills in entries within the color gamut of the target printer with the closest printable color. Colors out of the printer's gamut are represented by an averaging of the printable colors and of the outer range of colors assigned for the saturates. A requested color is converted to the reference color space, then looked up in the table, and the resulting color specification is sent to the printer.

19 Claims, 2 Drawing Sheets

SUBJECTIVELY PLEASING COLOR GAMUT MAPPING IN A COLOR COMPUTER GRAPHICS SYSTEM

This application is a continuation of application Ser. No. 08/647,201, filed May 9, 1996, now abandoned, which is a continuation of application Ser. No. 08/197,059, filed Feb, 16, 1994, now abandoned.

BACKGROUND OF THE INVENTION

1. Field of the Invention

The present invention relates to color computer graphics and more particularly to color gamut mapping in which source device colors not reachable by a destination device are mapped to other colors that are reachable by the destination device.

2. State of the Art

Color matching algorithms are intended to present information on one medium so that it appears the same as when presented on a different medium. For Cathode Ray Tube (CRT) color displays, the CIE (Commission Internationale de l'Eclairage) has established standards which allow all displays to present color in the same manner, even though different colors are used to generate the image. However, since printing is a subtractive process (CRTs using an additive process), it becomes difficult to tell a printer what amounts of its subtractive primaries to use to present the same color when told the additive primaries of the CRT.

Neugebauer, Electronics For Imaging, Kodak, and numerous others have attempted to convert from the color representation on a CRT to a color specification on a printer. The general consensus is that an interpolated table is an adequate method for converting from the CRT color space to the printer's color space. However, if one measures the colors available to a CRT and those available to a color printer, one finds that a small amount of colors which are printable cannot be displayed on the CRT, while many colors which may be displayed on the CRT cannot be printed, especially green, yellow, red, and magenta. The color range available to an imaging device is referred to as its color gamut, and this non-overlapping nature of the color gamuts between devices is known as gamut mismatch, and the colors which a source device can image but the destination device cannot image are known as out of gamut colors.

Conventionally, the general rule for mapping from a source device (such as a CRT) to a destination device (such as a color printer) is that all colors which are available to the destination device should print the source device's color as closely as possible; when printing out of gamut colors, hue angle, saturation, and lightness of the source device should be preserved as closely as possible.

However, when this algorithm is implemented, users do not like the results, especially when attempting to present monitor saturated colors such as yellow, green, red, and magenta. Usually, the yellow is the most objectionable, because most CRT yellows are more green than the printer's yellow. The result is that when saturated CRT yellow is requested, the color matching algorithm maps this color to white or a washed-out green. This typically isn't what the user had in mind when requesting saturated yellow, although this is a correct color science representation of that color.

Assuming that images to be printed will typically consist of a combination of natural images and computer generated images, ideally the natural images would map to the closest printable colors, and the computer generated images would map to the saturated printer colors. However, there is usually no way to tell the source of a color specification.

What is needed, then, is a method whereby natural images may be printed to match as closely as possible the color seen on a CRT while presenting saturated CRT colors as saturated printer colors.

SUMMARY OF THE INVENTION

The present invention, generally speaking, provides a method whereby natural images may be printed to match as closely as possible the color seen on a CRT while presenting saturated CRT colors as saturated printer colors. The method allows for a unified treatment of natural and computer-generated images such that the identical method may be used for both conditions. More particularly, the present invention provides a method of mapping source device colors to destination device colors in a computer graphics system having a color image source device and a color image destination device having non-coincident color gamuts such that a plurality of colors within a color gamut of the source device are out of gamut colors outside a color gamut of the destination device. For out of gamut colors that are saturated source device colors having a maximum color component of a primary color, the saturated source device colors are mapped to respective destination device colors other than colors colorimetrically closest to the respective saturated source device colors. In order to achieve a more satisfactory rendering of computer-generated images, the saturated source device colors are mapped to first destination device colors more saturated than respective ones of said colors colorimetrically closest. In a preferred embodiment, the saturated source device colors are mapped to saturated destination device colors. Hence, in the case of a color CRT monitor and a color printer, when saturated monitor yellow is specified, for example, it is mapped to saturated printer yellow instead of the colorimetrically closer (but visually less pleasing) pale green typical of the prior art. Out of gamut colors that are not saturated source device colors are mapped to an average color of 1) at least one (preferably more than one) first destination device color mapped to from at least a closest saturated source device color, and 2) at least one (preferably more than one) closest in-gamut color of the destination device.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

The present invention is applicable to color mapping between any arbitrary pair of a source device and a destination device. For convenience of description, however, the invention will be described in the context of building an interpolated table for converting from a CRT color space to a printer's color space.

Briefly, this is accomplished by, first, measuring the printable colors in some device-independent color space, such as L*a*b*. Next, colors in an outer range of colors from some reference color CRT, consisting of the colors from black to monitor saturates, and the colors between, then from saturates to white, and the colors between, are calculated. The calculation determines the coordinates of each-color in L*a*b* space from its coordinates in the CRT color space using a set of methematical relations. A good choice for the CRT color space would be the color space defined by CCIR 709 and otherwise known as "calibrated RGB space", but any color space could be used. The saturates are assigned colors based on what printable color a user would like to get when the user asks for a saturated CRT color. Based on this assignment, the other colors whose L*a*b* coordinates have been calculated are also assigned printer colors. This assignment gives the printer's representation of the outer range of the color gamut of the CRT.

Next, a table is generated which sub-samples all colors available to the specified color space, converting the sub-sampled colors to the reference color space from the CRT color space. For example, in the case of a calibrated RGB color space in which each color component is specified by an eight-bit value from 0 to 255, the sub-sampling might sample only those colors whose components differ in the four most-significant bits. In the resulting table, entries within the color gamut of the target printer are each filled in with the closest printable color. Colors out of the printer's gamut are represented by an averaging of the printable colors and of the outer range of colors assigned for the saturates. A requested color is converted to the reference color space (e.g., a calibrated RGB space), then looked up in the table, and the resulting color specification is sent to the printer.

Figure 1:
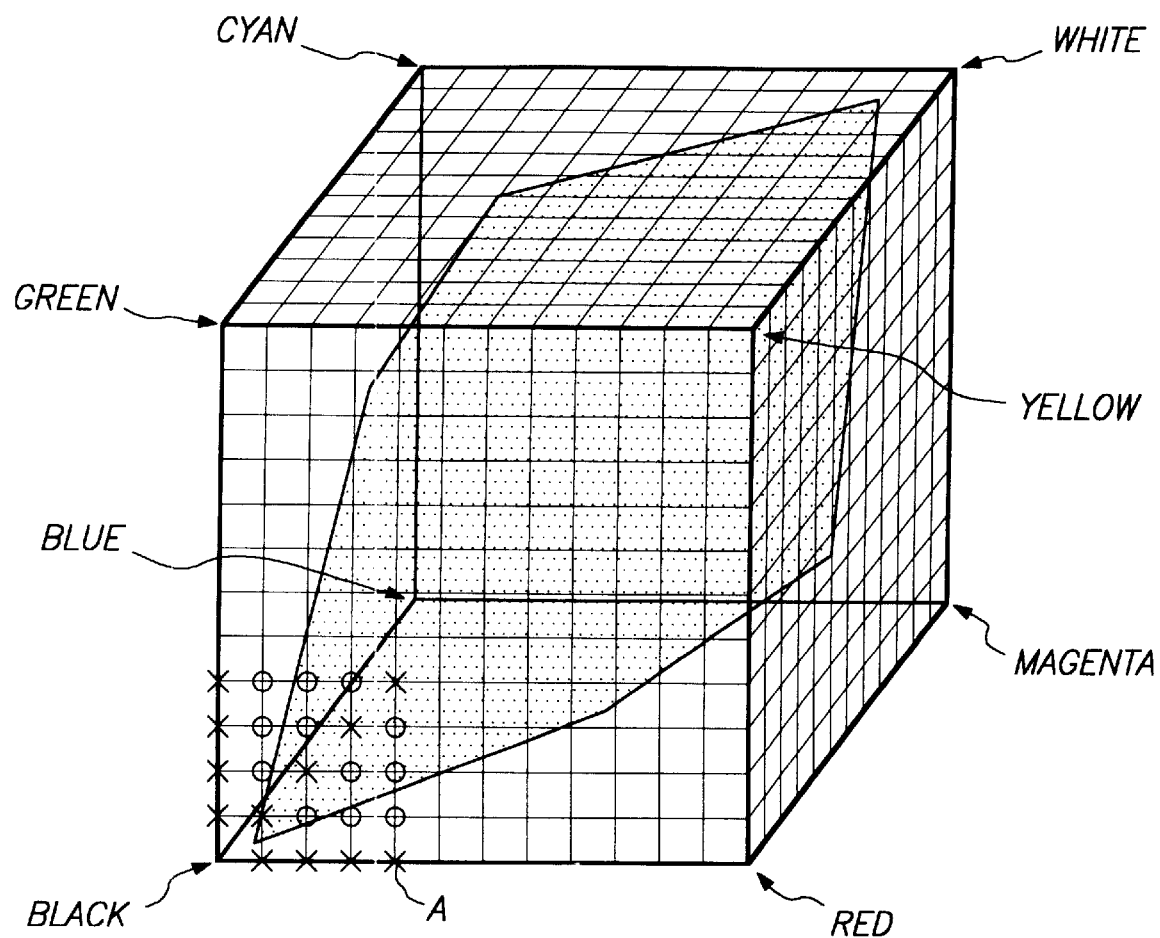
FIG. 1 is a prespective view of an RGB Cube representing a color source device and a cloud of destination device measurements.

The mapping described may be represented geometrically. Referring to FIG. 1, each grid intersection represents an entry in the 3-D lookup table. The cube represents all colors available to the source device. The dots represent the available colors of the destination device as determined by colorimetric measurements. As described, the outer walls of the color space are assigned a mapping from the source to the destination color space. Lookup table value assigned to grid intersections within the cloud of dots are interpolated from the measured data. Lookup table values assigned to grid intersections which are neither within the cloud not on the outer walls of the color space are assigned values between the closest wall value and the closest cloud value.

In general, mapping from the source color space to the destination's color space involves the steps of measuring colors available to the destination device, generating "synthetic" colors used to represent source device saturates, building a three-dimensional lookup table relating source device colors and destination device colors, and using the lookup table to converting a specified color from the source color space to the destination color space. Each of these steps are described in greater detail.

Measuring colors available to the destination device

Initially, the color gamut of the destination device is assumed to be unquantified. In order to accurately characterize the color gamut of the destination device, colors produced by the destination device are measured in a device-independent color space (such as L*a*b*). The colors measured should include a large number of primary colors, secondary colors, cross colors, and achromats (grays) so as to be representative of the entire color space of the destination device. In the case of a color ink-jet printer, for example, several hundred measurements might be generated in order to achieve accurate color matching.

A first lookup table is then built which characterizes the L*a*b* color according to the color specification sent to the destination device (for example, CMYK). The result is a large number of color specification pairs (L*a*b*, CMYK). The order of the pairs within the first table is not important.

Generating the synthetic colors for source device saturates

The next step is to identify the endpoints of the saturated colors, i.e., determine what destination color is used when a source saturated primary or secondary is requested. This determination, however, rather than being made colorimetrically as in the prior art, is made visually. For example, computer-generated color images each using a single one of the six saturates (red, green, blue, cyan, magenta and yellow) may be rendered using different alternative printer colors. The original image as rendered on a CRT and the different printer images may be presented to a large number of users to determine a correspondence most pleasing to the largest number of users. These colors are termed "synthetic" colors, because their correspondence to the endpoints of the saturated colors is an artificially drawn correspondence, not a natural colorimetric correspondence. In an exemplary embodiment, the synthetic colors are specified in RGB space as follows:

```
long endpoints[6][3] = {{255, 15, 15}    /*red saturated value*/
                        {255, 255, 15}   /*yellow saturated value*/
                        {60, 255, 60}    /*green saturated value*/
                        {100, 255, 60}   /*green saturated value*/
                        {15, 127, 255}   /*blue saturated value*/
                        {255, 31, 255}}; /*magenta saturated value*/
```

Using the synthetic colors, the outer limits of the source color space may be generated by interpolation. The step size used for generating this data should be the same as the step size to be used in the untimate mapping table. In an exemplary embodiment, the step size is 15. In other words, in any dimension, the color component values used to address adjacent table entries in the lookup table differ by this amount.

The primary and secondary saturated colors are interpolated directly by stepping from black toward each of the six saturates and interpolating between black and the saturated colors ("synthetic" colors) as determined by the above mapping. In FIG. 1, for example, the colors represented by the grid points marked with the letter X are among those interpolated directly from the saturated colors. Hence, the color represented by the grid point A in FIG. 1 would be interpolated as follows:

$$A = \text{Black} \times 8/12 + \text{Yellow} \times 4/12 = 4/12[255, 255, 15]$$

For each step, each of the cross colors between the primaries and secondaries is interpolated (red to yellow, yellow to green, green to cyan, cyan to blue, blue to magenta, magenta to red) to fill the lookup table locations corresponding to the outer walls of the color space with assigned values. In FIG. 1, for example, the colors represented by the grid points marked with the letter O are among those interpolated from the previously-interpolated saturated colors.

Once the saturates have been reached stepping from black, the process is repeated stepping from the saturates to white. At the conclusion of this process, the lookup table locations corresponding to the outer walls of the color space will have all been assigned values.

Building the lookup table

After generating the synthetic colors for source device saturates, the lookup table is partially populated with entries generated from the synthetic color data. The remaining bulk of the lookup table entries are then generated based on the measured data and the synthetic data. For each step, the device independent color specification (L*a*b*) for the source color is calculated using a set of well-known mathematical relations.

Whether or not the color is reproducible by the destination device is judged in accordance with distances in the device-independent color space between the source device color and the closest measured destination device colors. The euclidean distance (or color distance, ΔE) between the source color and each measured device color is caculated in turn, and some number of the closest device colors are retained in order from closest to farthest in a scratchpad area of computer memory. In an exemplary embodiment, the 20 closest measured destination colors are stored. At the same time, the color distance between the source color and each synthetic device color is caculated in turn, and some number of the closest synthetic device colors are retained in order from closest to farthest in a scratchpad area of computer memory. In an exemplary embodiment, the three closest synthetic destination colors are stored.

If the distance from the source color to the closest destination color is less than or equal to some threshold value (0.8 in a preferred embodiment), then the destination color is considered to be an exact match of the source color, and an equivalent representation (RGB) of the destination device specification (CMYK) of the destination color is entered in the lookup table.

If the distance from the source color to the closest destination color is greater than the threshold value, then the match is considered not exact. The table entry for the source color is then calculated by interpolating between the four closest destination points which form a tetrahedron, if such points can be found.

Various techniques for tetrahedral interpolation are known in the art and may be used with the present invention. One such technique is described in Hung, Colorimetric calibration in electronic imaging devices using a look-up-table model and interpolations, *Journal of Electronic Imaging* 2(1), 53–61 (January, 1993), incorporated herein by reference. As described therein, matrix inversion may be used to determine whether a point is included in a tetrahedron formed by four other points using the following equation:

$$\begin{bmatrix} \alpha \\ \beta \\ \gamma \end{bmatrix} = \begin{bmatrix} r_1 - r_0 & r_2 - r_0 & r_3 - r_0 \\ g_1 - g_0 & g_2 - g_0 & g_3 - g_0 \\ b_1 - b_0 & b_2 - b_0 & b_3 - b_0 \end{bmatrix}^{-1} \cdot \begin{bmatrix} r_P \\ g_P \\ b_P \end{bmatrix},$$

$$\alpha \geq 0, \beta \geq 0, \gamma \geq 0, \text{ and } \alpha + \beta + \gamma \leq 1$$

Beginning with the first four closest points as recorded in scratchpad memory, each permutation of points is checked in turned until the points are found to form a tetrahedron about the source color point or until the points are exhausted. In the instance where no four points are found to form a tetrahedron about the source color point, the source color is judged not to be reproducible by the destination device and is treated accordingly as described below. The order in which the twenty closest measured destination color points are checked is as follows:

| 1 | 1 | 1 | 1 |
|---|---|---|---|
| 2 | 2 | 2 | 2 |
| 3 | 3 | 3 | 3 |
| 4 | 5 | 6 | 20 | then, if necessary,

| 1 | 1 | 1 | 1 |
|---|---|---|---|
| 2 | 2 | 2 | 2 |
| 4 | 4 | 4 | 4 |
| 5 | 6 | 7 | 20 | and so on.

If the color is one of the synthetic color points, the generated point is used directly. Since the steps used to generate the synthetic data are the same as those used to generate the mapping table, there will always be an exact match for colors along the outer walls of the color space for the source device.

If the color is not on the wall of the source device and not within the printable range of the destination device, the three closest generated colors and the three closet destination device colors are selected and a weighted interpolation is performed to generate the color for that point.

Figure 2:
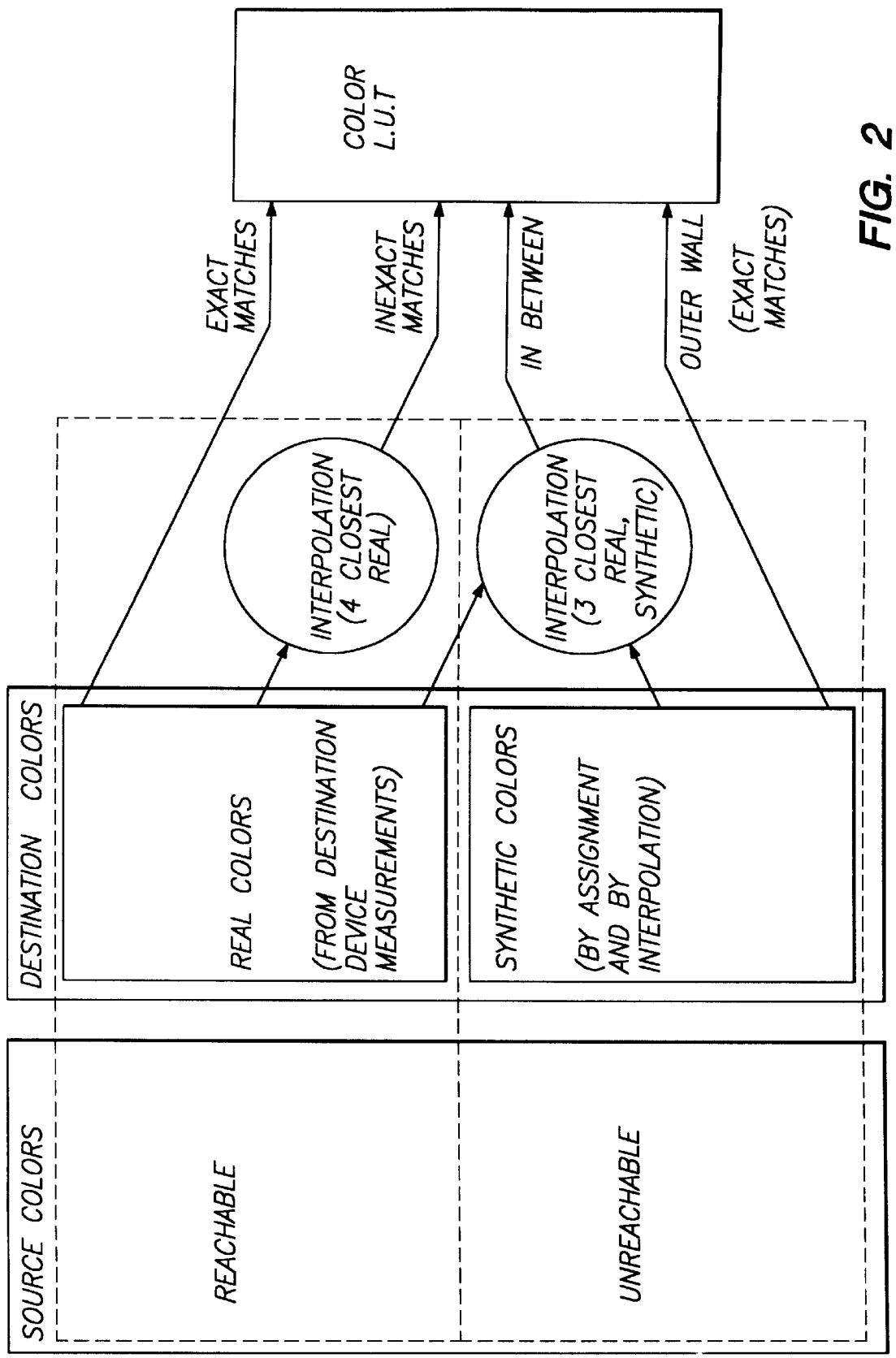
FIG. 2 is a schematic diagram of a color mapping arrangement in accordance with the present invention.

The present color mapping arrangement may be summarized with reference to FIG. 2. Source colors include colors reachable by the printer or other destination device and colors unreachable by (not within the color gamut of) the destination device. The destination colors include real colors bearing a predetermined calorimetric relation to the corresponding reachable source colors and synthetic colors assigned values based on subjective user preferences and not bearing any predetermined colorimetric relation to the corresponding unreachable source colors. For source colors for which exact matches are found among the real colors, the respective color specification is used directly. For source colors on the outer wall of the source color space, exact matches will be found among the synthetic colors. These values are therefore entered in the color lookup table and used directly.

For colors judged to be reachable but for which no exact match is found among the real colors, a value is arrived at by interpolating between the four closest real colors. Finally, for colors judged to be unreachable and for which no exact match is found, a value is arrived at by interpolating between the three closest real colors and the three closest synthetic colors.

Using the lookup table

The mapping table is used to look up a destination color based on a color specification for the source device. Since the color mapping table is a subset of all reproducible colors, adjacent points are selected by the source color specification and interpolated to provide the destination color specification. Various suitable interpolation techniques are well-known in the art. A preferred embodiment of the invention uses trilinear interpolation to simulate a complete lookup table, but other interpolation techniques could be used.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. In a computer graphics system having a color image source device and a color image destination device having non-coincident color gamuts such that a plurality of colors within a color gamut of the source device are out of gamut colors outside a color gamut of the destination device, a method of mapping source device colors to destination device colors, comprising the steps of:

storing in advance in fixed, non-volatile, machine-readable form a correspondence between 1) out of gamut colors that are saturated source device colors having a maximum color component of a primary color, and 2) respective destination device colors other than colors colorimetrically closest to the respective saturated source device colors, said correspondence being based on subjective judgements of a plurality of human subjects instead of being analytically derived; and mapping saturated source device colors to respective destination device colors based on said correspondence.

2. The method of claim 1, wherein the saturated source device colors are mapped to first destination device colors more saturated than respective ones of said colors colorimetrically closest.

3. The method of claim 2, wherein the saturated source device colors are mapped to saturated destination device colors.

4. The method of claim 1, comprising the further step of:

mapping out of gamut colors that are not saturated source device colors to an average color of 1) at least one first destination device color mapped to from at least a closest saturated source device color, and 2) at least one closest in-gamut color of the destination device.

5. The method of claim 4, wherein out of gamut colors that are not saturated source device colors are mapped to an average color of 1) a plurality of first destination device colors mapped to from a plurality of closest saturated source device colors, and 2) at least one closest in-gamut color of the destination device.

6. The method of claim 4, wherein out of gamut colors that are not saturated source device colors are mapped to an average color of 1) at least one first destination device color mapped to from at least a closest saturated source device color, and 2) a plurality of closest in-gamut colors of the destination device.

7. The method of claim 4, wherein out of gamut colors that are not saturated source device colors are mapped to an average color of 1) a plurality of first destination device colors mapped to from a plurality of closest saturated source device colors, and 2) a plurality of closest in-gamut colors of the destination device.

8. The method of claim 7, wherein said average color is formed as a weighted average of colors 1) and colors 2) using weights at least one of which is different than unity.

9. The method of claim 8, wherein one of the weights is inversely proportional to a distance in color space of a source device color to one of: the first destination device colors mapped to from a plurality of closest saturated source device colors and the plurality of closest in-gamut colors of the destination device.

10. The method of claim 9, wherein respective ones of the weights are inversely proportional to respective distances in color space of a source device color to respective ones of: the first destination device colors mapped to from a plurality of closest saturated source device colors and the plurality of closest in-gamut colors of the destination device.

11. A color mapping apparatus for mapping colors to be used in a computer graphics system having a color image source device and a color image destination device having non-coincident color gamuts such that a plurality of colors within a color gamut of the source device are out of gamut colors outside a color gamut of the destination device, the apparatus comprising:

a memory for storing in advance in fixed, non-volatile, machine-readable form a correspondence between 1) out of gamut colors that are saturated source device colors having a maximum color component of a primary color, and 2) respective destination device colors other than colors colorimetrically closest to the respective saturated source device colors, said correspondence being based on subjective judgements of a plurality of human subjects instead of being analytically derived;

means for mapping saturated source device colors of a computer image to respective destination device colors based on said correspondence; and means for mapping out of gamut colors that are not saturated source device colors to an average color of 1) at least one first destination device color mapped to from at least a closest saturated source device color, and 2) at least one closest in-gamut color of the destination device.

12. The apparatus of claim 11, wherein the saturated source device colors are mapped to first destination device colors more saturated than respective ones of said colors colorimetrically closest.

13. The apparatus of claim 12, wherein the saturated source device colors are mapped to saturated destination device colors.

14. The apparatus of claim 11, further comprising means for mapping out of gamut colors that are not saturated source device colors to an average color of 1) a plurality of first destination device colors mapped to from a plurality of closest saturated source device colors, and 2) at least one closest in-gamut color of the destination device.

15. The apparatus of claim 14, further comprising means for mapping out of gamut colors that are not saturated source device colors to an average color of 1) at least one first destination device color mapped to from at least a closest saturated source device color, and 2) a plurality of closest in-gamut colors of the destination device.

16. The apparatus of claim 14, further comprising means for mapping out of gamut colors that are not saturated source device colors are to an average color of 1) a plurality of first destination device colors mapped to from a plurality of closest saturated source device colors, and 2) a plurality of closest in-gamut colors of the destination device.

17. The apparatus of claim 16, wherein said average color is formed as a weighted average of colors 1) and colors 2) using weights at least one of which is different than unity.

18. The apparatus of claim 17, wherein one of the weights is inversely proportional to a distance in color space of a source device color to one of: the first destination device colors mapped to from a plurality of closest saturated source device colors and the plurality of closest in-gamut colors of the destination device.

19. The apparatus of claim 18, wherein respective ones of the weights are inversely proportional to respective distances in color space of a source device color to respective ones of: the first destination device colors mapped to from a plurality of closest saturated source device colors and the plurality of closest in-gamut colors of the destination device.

* * * * *

UNITED STATES PATENT AND TRADEMARK OFFICE
CERTIFICATE OF CORRECTION

PATENT NO. : 5,903,275
DATED : May 11, 1999
INVENTOR(S) : Randall G. Guay

Title page, item [57]
In the Abstract:

Line 8, after "measured" the misspelled word "is" should be "in".

Line 9, after "color" the misspelled word "sapce" should be "space".

Line 15, after "good" the misspelled word "coice" shold be "choice".

Signed and Sealed this

Twelfth Day of September, 2000

*Attest:*

Q. TODD DICKINSON

*Attesting Officer*      *Director of Patents and Trademarks*